WORD SELECT AND CHARACTER INHIBIT MEMORY SYSTEM

Filed May 17, 1965

INVENTOR.
FLOYD W. LOOSCHEN
BY
Christie, Parker & Hale
ATTORNEYS.

INVENTOR.
FLOYD W. LOOSCHEN
BY
Christie, Parker & Hale
ATTORNEYS.

United States Patent Office 3,444,534

Patented May 13, 1969

3,444,534

WORD SELECT AND CHARACTER INHIBIT MEMORY SYSTEM

Floyd W. Looschen, Arcadia, Calif., assignor to Burroughs Corporation, Detroit, Mich., a corporation of Michigan Filed May 17, 1965, Ser. No. 456,100
Int. Cl. G11b *5/00*
U.S. Cl. 340—174 7 Claims

ABSTRACT OF THE DISCLOSURE

A magnetic core memory for storing words of information containing characters but for only reading out and writing only a preselected character of a word. Word lines cause a complete word of information to be read out from the memory. Inhibit signals are applied to inhibit lines to cancel out the effective read signal from a word line for all characters except for the preselected character. A first selection circuit selects the inhibit lines to receive the inhibit signal. A second selection circuit applies a partial selection signal to the appropriate inhibit lines for only the selected character of cores causing a character of information read out of the memory or a new character of information to be written back into the same location from which the selected character was read.

This invention relates in general to memory addressing and information recovery systems, and more particularly, relates to a word select and character inhibit addressing system for a core memory in which one character at a time of a selected word is made available for utilization circuitry.

Word select core memory systems are known to the art in which a selection matrix applies a read current to one word plane of a core memory in order to read out an entire desired word. One such word normally contains several characters, each having a predetermined number of binary bits as determined by the number of bit planes, or cores, in each character of the desired word. An individual sense winding and associated sense amplifier is provided for each bit of the memory word. In addition, each bit of the memory word is also provided with a read and write logic gate, as well as a storage circuit. This prior art approach is satisfactory for apparatus in which an entire word is to be recovered and processed by the utilization circuitry of the system.

The above-described prior art approach has also found use in system apparatus wherein only one character at a time of a selected word is to be processed by the system's utilization circuitry. In the past, this latter operation has been performed by utilizing standard word select addressing in which an entire word of a memory's word plane is read out and all of the bits of that word are stored in individual register circuits after each bit has been recovered and amplified by its individual sense winding and amplifier. A gating circuit is connected between all of the numerous bit storage circuits and the utilization circuit is enabled in a preselected manner in order to pass on to the utilization circuit only those bits which formed a designated and desired character of the multi-character word.

The prior art approach described above for a one character at a time operation requires as many sense amplifiers and individual flip-flops or register stages as there are bits in an entire word plane, and thus is unattractive in that considerable circuitry is required. Furthermore, if the prior art system employs a memory stack of the destructive read-out type, each entire word must either be re-circulated and rewritten into the memory word plane while the desired and recovered character is being processed by the utilization circuitry, or the storage register must be seized and held during the processing time so that other characters of the word are available as desired for the utilization circuitry. Either of these alternatives presents undesirable situations because the re-circulation approach requires excessive circuitry and introduces room for error in the system. The register seizing approach, of course, wastes considerable time and is objectionable in that the entire memory is held up during the information processing operation.

The addressing system of this invention avoids the above-mentioned disadvantages of the prior art in that a plurality of word lines are provided, each word line linking a different plurality of cores in the system. The cores linking each word line are arranged into groups, each group stores one character of a word of information. Each character in a word is associated with a character in each of the other words. A plurality of inhibit lines is provided for each character in a word. The plurality of inhibit lines link the cores in the associated characters in all of the words. Addressing means is provided for designating a character in a word to be read from the memory system. Means is provided for selectively applying a read pulse followed by a write pulse to the word line corresponding to the designated word. The read pulse is of sufficient magnitude to switch all cores linked thereto from one magnetic state to the other causing a read out signal whereas the write pulse only partially switches the cores. First selection means is provided for selectively applying a character inhibit pulse in coincidence with the read pulse to all inhibit lines linking cores for non designated characters and thereby inhibit the read pulse from switching all cores of the designated word except for the cores in the designated character causing a read out signal from the designated character of cores. Second selection means is coupled to the readout signals for selectively applying a partial switching pulse in coincidence with the write pulse to the inhibit lines associated with the designated character of cores and thereby cause the combined write and partial switching pulse to selectively switch the same designated character of cores back to the same magnetic state as that existing before reading. Accordingly, considerable savings in components is possible by the circuitry of the memory addressing system of this invention which utilizes a current of opposite polarity than the systems read current to inhibit non-selected cores during a read operation.

For a more complete understanding of this invention, reference should be had to the accompanying drawing in which.

Figure 1:
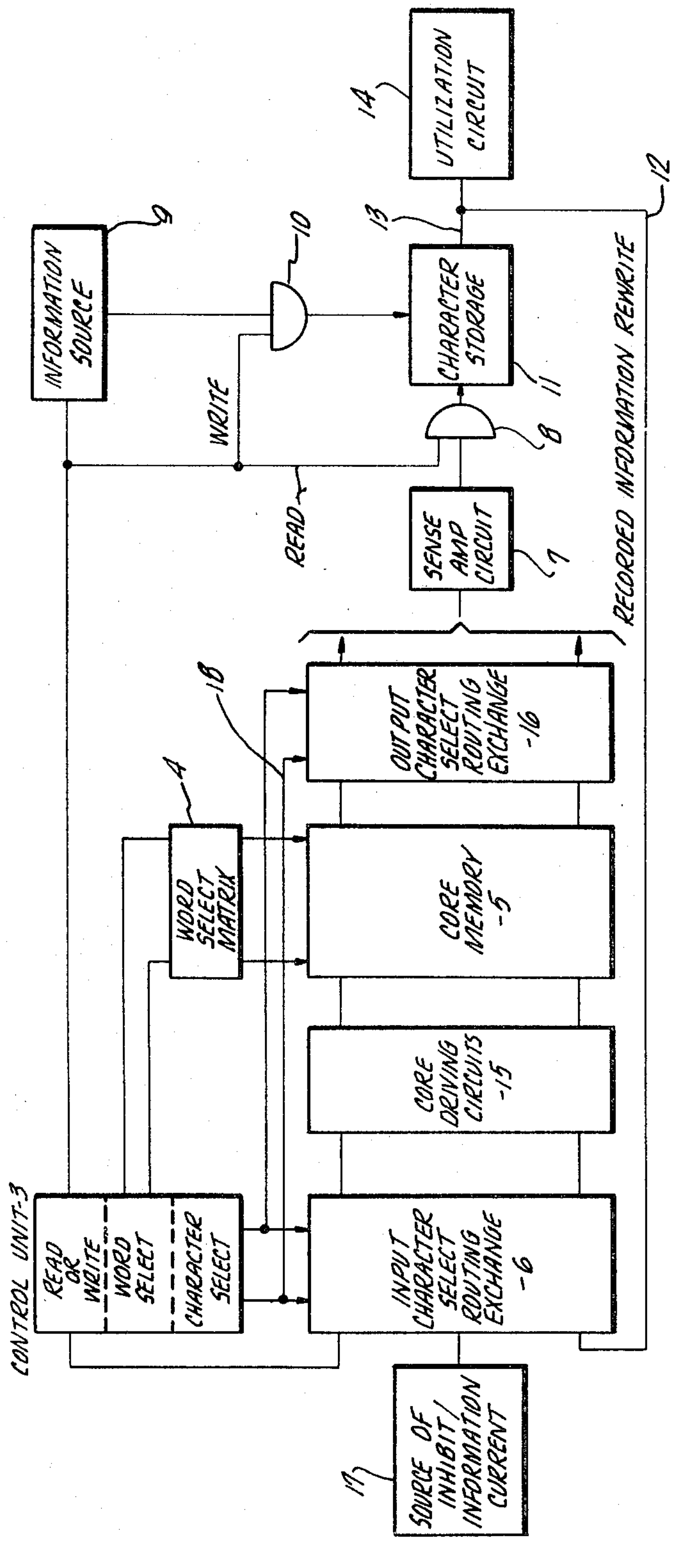
FIG. 1 is a block diagram of a memory addressing and information recovery system of this invention.

The memory addressing and information recovery system of FIG. 1 includes a control unit 3 which performs several separate control functions, including a read or write command, a word select command, and a character select command. A selection matrix 4, which may advantageously be of the type known to the art and commonly referred to as a "word," or "linear" select, is connected between the control unit 3 and is responsive to a word select command for applying a read or write current through one entire word stack of a core memory 5. Two character select routing exchanges, namely, an input exchange 6 and an output exchange 16 are also connected to the control unit 3 and to core memory 5, and are responsive to character select commands from the control unit 3 for recovering and for establishing an information transmission path for one character only of a word addressed by word select matrix 4.

A character storage circuit 11 has its input fed by a series-connected information transmission gate 8 which passes a character that has been recovered and amplified by the sense amplifying circuits 7. The information transmission gates 8 (of which only one is shown in FIG. 1) are logic gates which are controlled by the read or write portion of control unit 3, and are selectively energized by read signals from control unit 3 when it is desired that a selected character, designated in the output character select routing exchange 16, is to be recovered and stored in the storage circuit 11.

The system depicted in FIG. 1 has a destructive read-out core memory 5, although the principles of this invention are equally applicable to non-destructive read-out systems. Accordingly, a recovered information rewrite circuit 12 is connected to the information lead 13 which connects the character storage circuit 11 to the utilization circuit 14. This rewrite circuit feeds back the recovered information in storage circuit 11 to the character select routing exchange circuit 6. A group of core driving circuits 15 are connected between the input character selected routing exchange 6 and the core memory 5. These driving circuits are operative during both a read and a write operation for the core memory 5, as will be described hereinafter.

A read operation for the system of FIG. 1 requires that control unit 3 apply a read word select signal to the word select matrix 4 and a character inhibit command to character select exchange 6. The combination of the read and character select signals applied by the control circuit 3 to the character select exchange 6 connects a source of inhibit current 17 to the core driving circuits 15 which in turn drives current through only those cores of a selected word which make up the non-selected characters of that word. The signals applied to the exchange 6 are also applied via leads 18, to the character select exchange 16 in order to complete a transmission path only for the selected character of the selected word, i.e., the character which does not have inhibit current applied thereto by input exchange 6. Output character exchange 16 is optional as explained in detail hereinafter.

One word of the core member 5 is selected by the selection matrix 4 which applies sufficient read current to switch all the cores which make up the various characters of the addressed word. However, in accordance with the principles of this invention, the input exchange 6, inhibit source 17 and core driving circuit 15 are operative for applying inhibit current through the non-selected characters of the addressed word. This inhibit current is of sufficient magnitude and direction to prevent cores which normally would be switched, from being switched by the read current from the word selection matrix 4. Thus, during a read operation in the system of FIG. 1, the character select output exchange 16 will complete a transmission path only for the selected character of core 5 which does not have inhibit current passing through its cores. The information which has been previously stored in the cores of this selected character is amplified by the sense amplifier circuit 7, and during the read operation is passed by transmission gates 8 on to the character storage circuit 11 wherein such information is available for processing by the utilization circuit 14.

Each read operation for the destructive read-out memory of FIG. 1 is followed by a write operation, during which the information stored in character storage circuit 11 is fed back by information rewrite circuit 12 to the character select input exchange 6. Control unit 3 applies a character selection command and write pulse to the exchange 6 and a write word select command to the word select matrix 4 coincidentally with the activation of the core driving circuit 15 by exchange 6. The coincidence of the word select write current from matrix 4 and the output current of the core driving circuit 15 re-stores information, which had previously been read, to the cores of the designated character of the selected word.

In many instances it may be desirable not to rewrite the same information back into core memory 5, but rather to store new information in the designated character of the selected word. When such is the case, the write operation again follows a read operation except that transmission gate 8 is not enabled during the read operation. Thus, the read current applied by control unit 3 through the word selection matrix 4 to core memory 5 switches all the cores in the selected character which are in a "one" state to the "zero" state, and leaves the "zero" cores in their "zero" state. Because transmission gate 8 is not enabled no information is passed to the character storage circuit 11. Instead, information source 9 applies information through a coincident logic gate 10 under command of control unit 3 to character storage circuit 11, and it is this information which is fed back by the rewrite circuit 12 to input exchange 6 for a write operation in core memory 5 as previously described.

In accordance with the principles of this invention as described in the foregoing, it is clear that although a word select operation is employed in which one word plane is selected, the new and novel addition of routing exchange circuits 6 and 16 permits one designated character at a time of the selected word to readily be made available to the utilization circuitry. The use of character inhibit current coincident with read word select chrrent prevents disturbance of non-selected characters of a selected word. This new and novel operation results in a considerable savings in time and circuitry, and further results in the elimination of probable sources of error as compared with the prior art approaches discussed hereinbefore.

Figure 2:
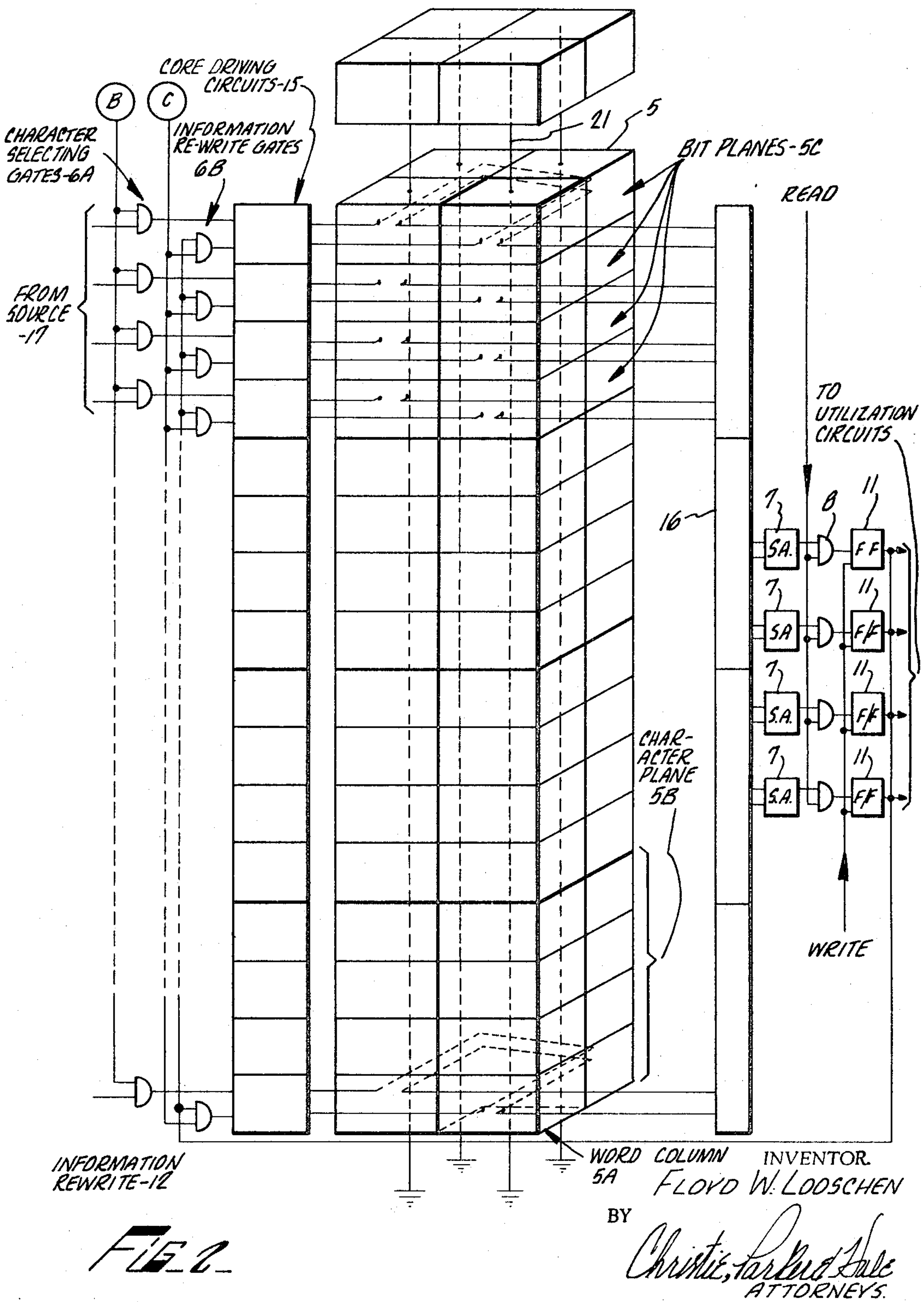
FIG. 2 is a combined block diagram and schematic of certain circuits of the system of FIG. 1.

The detailed word select and character inhibit operation of this invention by which one character only is gated from a core memory stack may readily be understood in greater detail by consideration of FIG. 2 which shows a schematic diagram of some of the circuitry of FIG. 1. Where there is a correspondence of circuitry in FIGS. 1 and 2, the same reference numbers are used. Thus, the core memory of FIG. 2 is designated 5, and is shown in an isometric view so that the various core stacks of the memory are exposed. This memory 5 may be any of the well known core stack memories in which information is read or written by a current pulse applied to one lead that passes through an entire word plane. In a similar manner the output character exchange 16 is repeated in block form in FIG. 2. This exchange is optional and when used may employ gates similar to those of the input exchange 6. In its simplest form output exchange 16 merely represents common connections for all similarly positioned bits of each one of the various different characters. In accordance with the operating principles of this invention the cores of one character only are switched during either a read or a write operation, and thus only one character at a time is capable of being read out because the inhibit current prevents switching in any of the remaining cores. These remaining cores of non-selected characters are thus ignored by the sense amplifiers and registers which are connected to output exchange 16.

The read or write current lead of FIG. 2 is lead 21 which passes through one word plane such as column 5A which is shown in dark outline form. This word column 5A includes 4 character planes such as the bottom character plane 5B. Each character plane in turn includes 4 bit planes 5C. Each bit plane represents one core of a multi-cored storage for a character. Each core is capable of storing binary signals. Four of such cores store the binary signals for one character of a four-character word. It should be understood of course, that the number of bit, character, and word columns as shown in FIG. 2 is merely representative of a cubed memory stack which is recognized in the art as the most economical memory organization, but is not to be taken as limiting, in that the principles of this invention apply equally well to various other memory stack organizations.

Figure 3:
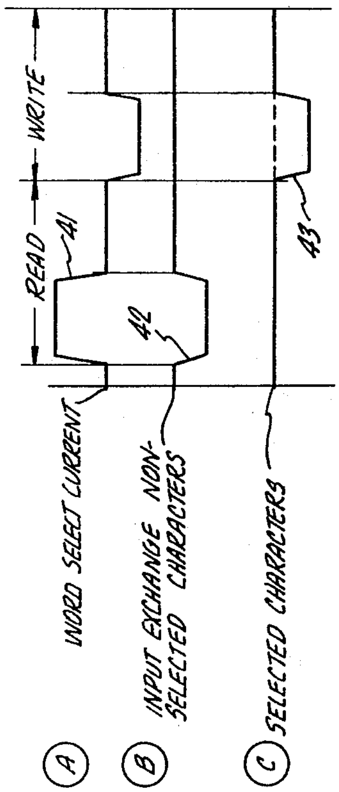
FIG. 3 is a waveform chart useful in promoting a full understanding of the circuit operation of FIGS. 1 and 2.

Waveform A of FIG. 3 shows a word select current pulse 41 which is applied to lead 21 of FIG. 2 for a read operation. Waveforms B and C of FIG. 3, respectively, depict the pulses which control unit 3 of FIG. 1 applies to the input character select routing exchange circuit 6 during a character designating operation. Routing exchange 6 includes two sets of coincident logic gates shown as the character selecting gate group 6A and the information rewrite gate group 6B. For the read operation depicted in the first time interval of FIG. 3, the character select gate group 6A is enabled by the control unit 3 and is operative for applying an activating signal to the core driving circuits 15 associated only with the non-designated characters of a selected word. The core driving circuit 15 responds to the enabling signals from the non-designated character gates of group 6A and drives current pulses such as 42 of FIG. 3 through the non-selected character planes of word 5A. The coincidence of current waveforms 41 and 42 in the cores of the non-selected characters prevents switching of any of the cores thereof.

Input signal C shown in FIG. 3 does not, during a read operation, activate the portion of core driving circuit 15 which is associated with and drives the selected character plane of the selected word in memory 5. Thus, the full pulse of word select current 41 has no corresponding inhibit current in the selected character plane, and accordingly all of the various cores in that character which have previously been set in a "one" state, are switched to a "zero" state, and will be recovered by the operation described below. Signals resulting from the switching of cores in the selected character are sensed and amplified by the four sense amplifier circuits 7 which are common to all of the characters in the memory core 5. A read signal applied by control unit 3 to signal transmission gates 8, which also may advantageously be coincidence gates, stores the information read from memory 5 by the sense amplifiers 7 into the storage flip-flop circuits 11. The outputs of flip-flop circuits 11 are fed back through the information rewrite circuit 12 to the information rewrite gate group 6B of character select routing exchange 6, and a subsequent write operation takes place in order to re-store the read-out information to memory core 5 under control of select current C in the manner shown by the write waveforms of FIG. 3 in accordance with the operation described hereinbefore. The fed back signals may either be a "one" or "zero" state as shown representatively by the solid and dashed lines of pulse 43 of waveform C of FIG. 3.

It is to be understood that the above described arrangements are illustrative of the principles of this invention. Numerous other arrangements may be devised by those skilled in the art without departing from the spirit and scope of this invention.

What is claimed is:

1. In a magnetic core memory system the combination comprising a plurality of word lines, each word line linking a different plurality of cores in the system, the cores linking each word line being arranged into groups each group storing one character of a word of information, and each character in a word being associated with a character in each of the other words, a plurality of inhibit lines for each character in a word, said plurality of inhibit lines linking the cores in the associated characters in all of said words, addressing means for designating a character in a word to be read from the memory system, means for selectively applying a read pulse followed by a write pulse to the word line corresponding to the designated word, the read pulse being of sufficient magnitude to switch all cores linked thereto from one magnetic state to the other causing a read out signal whereas the write pulse only partially switches the cores, first selection means for selectively applying a character inhibit pulse in coincidence with the read pulse to all inhibit lines linking cores for non-designated characters and thereby inhibit the read pulse from switching all cores of the designated word except for the cores in the designated character causing a readout signal from the designated character of cores and second selection means coupled to the readout signals for selectively applying a partial switching pulse in coincidence with the write pulse to the inhibit lines associated with the designated character of cores and thereby cause the combined write and partial switching pulse to selectively switch the same designated character of cores back to the same magnetic state as that existing before reading.

2. In a magnetic core memory system according to claim 1 including an output register, for storing signals corresponding to those signals read out from a designated character of cores and wherein the selection means couples the content of the output register back to the inhibit lines for the designated character.

3. In a magnetic core memory system according to claim 2 wherein there are a plurality of sense lines for each character, each sense line linking a separate core in each of the associated characters of cores, each sense line for each character being grouped together with an individual sense line for each of the other characters, said register means having a storage cell for each sense line for one character, and circuit means for coupling signals from each group of sense lines to an individual storage cell in the register.

4. In a magnetic core memory according to claim 3 wherein said second selection means comprises at least one gate for each inhibit line coupled to the register and to the address designating means for selectively causing a partial switching pulse to be applied to an inhibit line associated with a designated character of cores.

5. In a magnetic core memory according to claim 1 including magnetic core driver means coupled to each inhibit line for applying said inhibit signals thereto, said first selection means applying a signal to the appropriate core driver causing said character inhibit signal to be applied by such core driver to the corresponding inhibit line.

6. In a magnetic core memory system the combination comprising a plurality of word lines, each word line linking a different plurality of cores in the system, the cores linking each word line being arranged into groups each group storing one character of a word of information, and each character in a word being associated with a character in each of the other words, a plurality of inhibit lines for each character in a word, said plurality of inhibit lines linking the cores in the associated characters in all of said words, addressing means for designating a character in a word to be read from the memory system, means for selectively applying a read pulse followed by a write pulse to the word line corresponding to the designated word, the read pulse being of sufficient magnitude to switch all cores linked thereto from one magnetic state to the other causing a readout signal whereas the write pulse only partially switches the cores, first selection means for selectively applying a character inhibit pulse in coincidence with the read pulse to all inhibit lines linking cores for non designated characters and thereby inhibit the read pulse from switching all cores of the designated word except for the cores in the designated character causing a readout signal from the designated character of cores, storage register means for storing the readout signals or any new signals to be stored back into the same designated character of cores and second selection means coupled to the storage register means for selectively applying a partial switching pulse in coincidence with the write pulse to the inhibit lines associated with the designated character of cores and thereby cause the combined write and partial switching pulse to selectively switch the same designated character of cores to magnetic states representative of the character of information contained in the storage register means.

7. In a magnetic core memory system having word select lines each for reading out a word of cores, each of said words of cores having a plurality of groups of cores for storing characters of information, core character groups in one word being associated with individual core character groups in each of the other words of cores, the memory system having inhibit lines for each character group of cores for individually inhibiting switching of associated character groups of cores or for partially selecting individual cores in character groups, the combination comprising: a word and character address storing means, word selection means for selectively applying read and write control signals to the word lines corresponding to a stored address causing reading and writing in the corresponding word of cores, character select read and write means including a first selection means for applying an inhibit signal in coincidence with the read signal to all inhibit lines except to those inhibit lines for the cores not in the stored character address, the inhibit signal being of a polarity and magnitude to cancel the effectiveness of the read signal for the cores which are not in the selected character group, and register means having a storage cell for each core in one character group of cores for storing a character of information read out from the core memory by a read signal, the character select read and write means including a second selection means for selecting the group of inhibit lines for character groups of cores in the stored character address and for applying a partial select signal in coincidence with the write signal to individually selected ones of such inhibit lines, the individually selected inhibit lines being determined by the storage content of the register means thereby selectively causing the same information read from the memory to be restored back into the same memory location from which read.

References Cited

UNITED STATES PATENTS

| | | | |
|---|---|---|---|
| 3,215,992 | 11/1965 | Schallerer | 340—174 |
| 3,339,186 | 8/1967 | Cohen | 340—174 |
| 3,355,716 | 11/1967 | Miller | 340—174 |

FOREIGN PATENTS

| | | |
|---|---|---|
| 904,516 | 8/1962 | Great Britain. |

OTHER REFERENCES

Vinal, A. W.: Data Storage System, IBM Technical Disclosure Bulletin, 7(5), p. 380, October 1964.

BERNARD KONICK, *Primary Examiner.*

G. M. HOFFMAN, *Assistant Examiner.*